(12) United States Patent
Bastide et al.

(10) Patent No.: US 10,073,926 B2
(45) Date of Patent: *Sep. 11, 2018

(54) TEAM ANALYTICS CONTEXT GRAPH GENERATION AND AUGMENTATION

(71) Applicant: INTERNATIONAL BUSINESS MACHINES CORPORATION, Armonk, NY (US)

(72) Inventors: Paul R. Bastide, Boxford, MA (US); Matthew E. Broomhall, Goffstown, NH (US); Stephen Crawford, Dublin (IE); Andrew E. Davis, Arlington, MA (US); Eric S. Portner, Northborough, MA (US); Marco A. Vicente, Dublin (IE); Eric M. Wilcox, Los Altos, CA (US)

(73) Assignee: International Business Machines Corporation, Armonk, NY (US)

( * ) Notice: Subject to any disclaimer, the term of this patent is extended or adjusted under 35 U.S.C. 154(b) by 282 days.

This patent is subject to a terminal disclaimer.

(21) Appl. No.: 14/826,665

(22) Filed: Aug. 14, 2015

(65) Prior Publication Data

US 2017/0039296 A1    Feb. 9, 2017

Related U.S. Application Data

(63) Continuation-in-part of application No. 14/817,426, filed on Aug. 4, 2015.

(51) Int. Cl.
G06F 7/00      (2006.01)
G06F 17/00     (2006.01)
(Continued)

(52) U.S. Cl.
CPC .. *G06F 17/30958* (2013.01); *G06F 17/30424* (2013.01); *H04L 51/04* (2013.01); *H04L 51/22* (2013.01)

(58) Field of Classification Search
None
See application file for complete search history.

(56) References Cited

U.S. PATENT DOCUMENTS 7,503,007 B2 *   3/2009   Goodman ............ G06Q 10/107
                                                      707/999.104
7,512,612 B1     3/2009   Akella et al.
(Continued)

OTHER PUBLICATIONS

Byron Dom; "Graph-Based Ranking Algorithms for E-mail Expertise Analysis"; ACM; 2003; pp. 1-7.*
(Continued)

*Primary Examiner* — Mariela Reyes
*Assistant Examiner* — Jermaine Mincey
(74) *Attorney, Agent, or Firm* — Charles L. Moore; Moore & Van Allen PLLC

(57) ABSTRACT

A method for team analytics context graph generation and augmentation may include extracting a set of relevant features from a received message and predicting a context graph corresponding to the received message being sparse based on the extracted relevant features. A context of the received message is indeterminable from the context graph in response to the context graph being sparse. The method may also include generating an augmented context graph in response to the context graph being predicted to be sparse. The context of the received message is determinable from the augmented context graph. The method may additionally include presenting the augmented context graph.

15 Claims, 11 Drawing Sheets

(51) Int. Cl.
*G06F 17/30* (2006.01)
*H04L 12/58* (2006.01)

(56) References Cited

U.S. PATENT DOCUMENTS

| | | | |
|---|---|---|---|
| 7,685,016 | B2 | 3/2010 | Flores et al. |
| 8,135,711 | B2 | 3/2012 | Charnock et al. |
| 8,271,598 | B2 | 9/2012 | Guy et al. |
| 2005/0256949 | A1* | 11/2005 | Gruhl ............... G06Q 50/01 709/223 |
| 2008/0140655 | A1* | 6/2008 | Hoos ............... G06F 17/30994 |
| 2010/0076989 | A1* | 3/2010 | Jakobson ............ G06Q 10/00 707/758 |
| 2010/0192162 | A1 | 7/2010 | Conner et al. |
| 2011/0119338 | A1* | 5/2011 | Chen ................ G06Q 10/10 709/206 |
| 2012/0030194 | A1 | 2/2012 | Jain |
| 2013/0159425 | A1 | 6/2013 | Hogan et al. |
| 2014/0343936 | A1 | 11/2014 | Thapar |
| 2014/0344709 | A1* | 11/2014 | Roberts ............ H04L 12/1859 715/752 |

OTHER PUBLICATIONS

International Business Machines Corporation, "List of IBM Patents or Patent Applications Treated As Related," submitted Sep. 22, 2016, 2 Pages.
International Business Machines Corporation, "List of IBM Patents or Patent Applications Treated As Related," submitted Aug. 26, 2015, 2 Pages.
International Business Machines Corporation, "List of IBM Patents or Patent Applications Treated As Related," submitted Aug. 14, 2015, 2 Pages.
Slashdot; "Facebook Launches Advanced AI Effort to Find Meaning in Your Posts," Downloaded from the Internet on Aug. 12, 2015, pp. 1-17, <http://tech.slashdot.org/story/13/09/21/1831239/facebook-launches-advanced-ai-effort-to-find-meanin>.
Marketing Pilgrim; "Facebook Looks to Improve News Feed Content Quality," Downloaded from the Internet on Aug. 12, 2015, pp. 1-7, <http://www.marketingpilgrim.com/2013/08/facebook-looks-to-improve-news-feed-content . . . >.
IBM; "The IBM Rapidly Adaptive Visualization Engine Overview," pp. 1-3.
IBM Corporation; "IBM SPSS Statistics Editions," IBM Software Business Analytics, 2015, pp. 1-8.
IBM Corporation; "IBM SPSS Statistics: What's New," IBM Software Business Analytics, 2015, pp. 1-8.
MacLean, Diana, et al.; "Groups Without Tears: Mining Social Topologies from Email," Intelligent User Interfaces, 2011, pp. 83-92.
IBM; "Personal Cognitive Assistant for Meetings," IBM ifundIT, 2015, pp. 1-3.
Rohall, Steven L., et al.; "ReMail: A Reinvented Email Prototype," Conference on Human Factors in Computing Systems, 2004, pp. 791-792.
Sanebox, "Email Overload in the Enterprise: The science behind email productivity," Sanebox.com, No Publication date, pp. 1-8.
IBM; "Swiftfile 4.2 for IBM Notes 9.0: Installation and Usage Instructions," 2013, pp. 1-3.
Wikipedia, "Graph Theory," Downloaded from the Internet on Aug. 3, 2015, pp. 1-12, <http://en.wikipedia.org/wiki/Graph_theory>.
Wikipedia; "Natural language processing," Downloaded from the Internet on Feb. 6, 2015, pp. 1-11 <http://en.wikipedia.org/wiki/Natural_language_processing>.
Sanebox; "Your Email Without SaneBox," Downloaded from the Internet on Jul. 2, 2015, pp. 1-10 <http:/ www.sanebox.com/I/how-it-works#sthash.hEgocKRM.SmV6aodi.dpbs>.
Socialmediatoday; Understanding Facebook EdgeRank [Infographic], Downloaded from the Internet on Aug. 13, 2015, pp. 1-8, <http://www.socialmediatoday.com/content/understanding-facebook-edgerank-infographic>.
Wikipedia, "Deep Learning," Downloaded from the Internet on Feb. 6, 2015, pp. 1-16, <http://en.wikipedia.org/wiki/Deep_learning>.
IBM; "Social Recommendations API," IBM Connections Developers for Cloud: API Reference, Downloaded from the Internet on Aug. 14, 2015, pp. 1-5 <http://www-10.lotus.com/Idd/appdevwiki.nsf/xpAPIViewer.xsp?lookupName=API+Reference#action=openDocument&res_title=Social_Recommendations_API_ic50&content=apicontent>.

\* cited by examiner

TEAM ANALYTICS CONTEXT GRAPH GENERATION AND AUGMENTATION

BACKGROUND

Aspects of the present invention relate to electronic communications, such as mail clients and online networks, and more particularly to a method, system and computer program product for team analytics context graph generation and augmentation.

Mail Clients and Online Networks are a universal mechanism to connect people and information in logical and organized ways which enable sharing and processing of information between the users. The most common mechanisms of sharing and processing information are the inbox, wall, activity stream, timeline, or profile. These mechanisms enable a user to rapidly share information with others and gather information from others in the network. Each user of the network may create, read and respond to countless messages each day. As a result of such a large number of messages, a user may be unable to determine a context of a particular message when received. The user may have to review a considerable number of messages received earlier in order to determine the context of the particular message that was recently received. This can result in a considerable amount of time in reviewing messages that were previously received resulting in inefficiency. Additionally, there is no graphical representation of information to assist the user in determining the context of a new message and to automatically update information as new messages are received.

SUMMARY

According to one embodiment of the present invention, a method for team analytics context graph generation and augmentation may include extracting, by a processor, a set of relevant features from a received message and predicting, by the processor, a context graph corresponding to the received message being sparse based on the extracted relevant features. A context of the received message may be indeterminable from the context graph in response to the context graph being sparse. The method may also include generating, by the processor, an augmented context graph in response to the context graph being predicted to be sparse. The context of the received message may be determinable from the augmented context graph. The method may additionally include presenting, by the processor, the augmented context graph.

According to another embodiment of the present invention, a system for team analytics context graph generation and augmentation may include a processor and a module operating on the processor for team analytics context graph generation and augmentation. The module may be configured to perform a set of functions including extracting a set of relevant features from a received message and predicting a context graph corresponding to the received message being sparse based on the extracted relevant features. A context of the received message may be indeterminable from the context graph in response to the context graph being sparse. The set of functions may also include generating an augmented context graph in response to the context graph being predicted to be sparse. The context of the received message may be determinable from the augmented context graph. The set of functions may additionally include presenting the augmented context graph.

According to another embodiment of the present invention, a computer program product for team analytics context graph generation and augmentation may include a computer readable storage medium having program instructions embodied therewith. The computer readable storage medium is not a transitory medium per se. The program instructions are executable by a device to cause the device to perform a method including extracting a set of relevant features from a received message and predicting a context graph corresponding to the received message being sparse based on the extracted relevant features. A context of the received message may be indeterminable from the context graph in response to the context graph being sparse. The method may also include generating an augmented context graph in response to the context graph being predicted to be sparse. The context of the received message may be determinable from the augmented context graph. The method may additionally include presenting the augmented context graph.

BRIEF DESCRIPTION OF THE DRAWINGS

The present invention is further described in the detailed description which follows in reference to the noted plurality of drawings by way of non-limiting examples of embodiments of the present invention in which like reference numerals represent similar parts throughout the several views of the drawings and wherein.

DETAILED DESCRIPTION

Figure 1A:
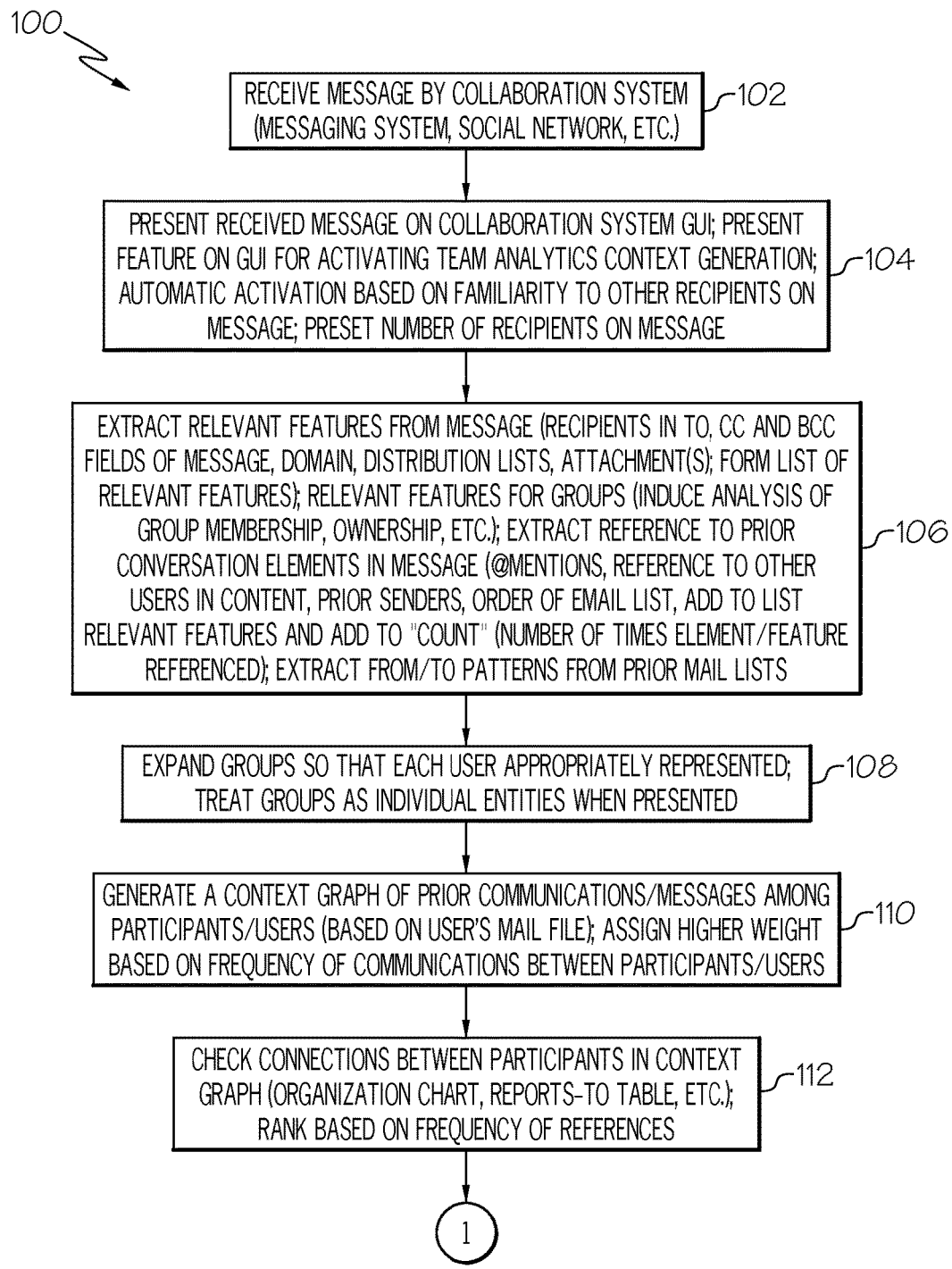
FIGS. 1A-1D are a flow chart of an example of a method for team analytics context graph generation and augmentation in accordance with an embodiment of the present invention.
Figure 1B:
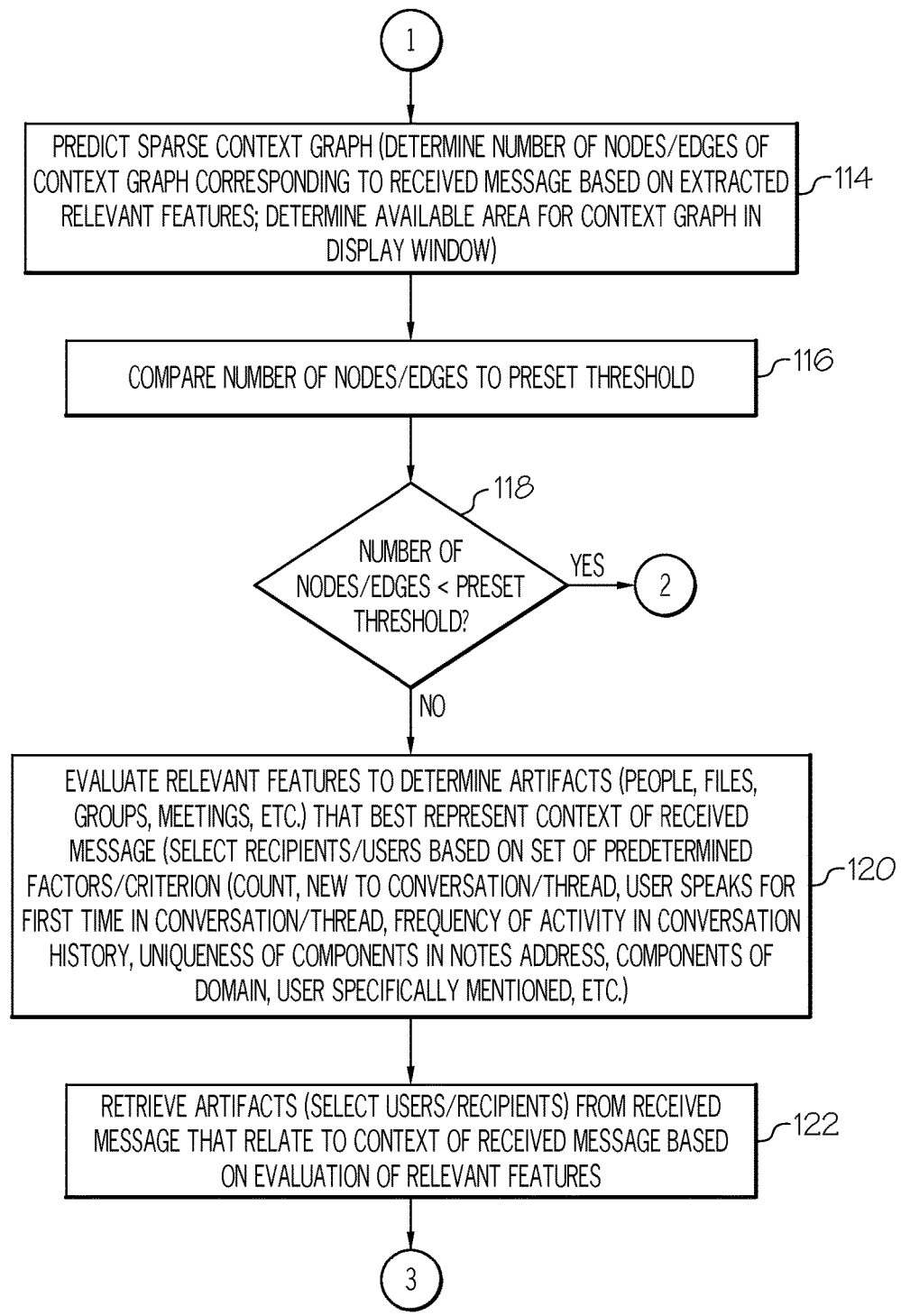
Figure 1C:
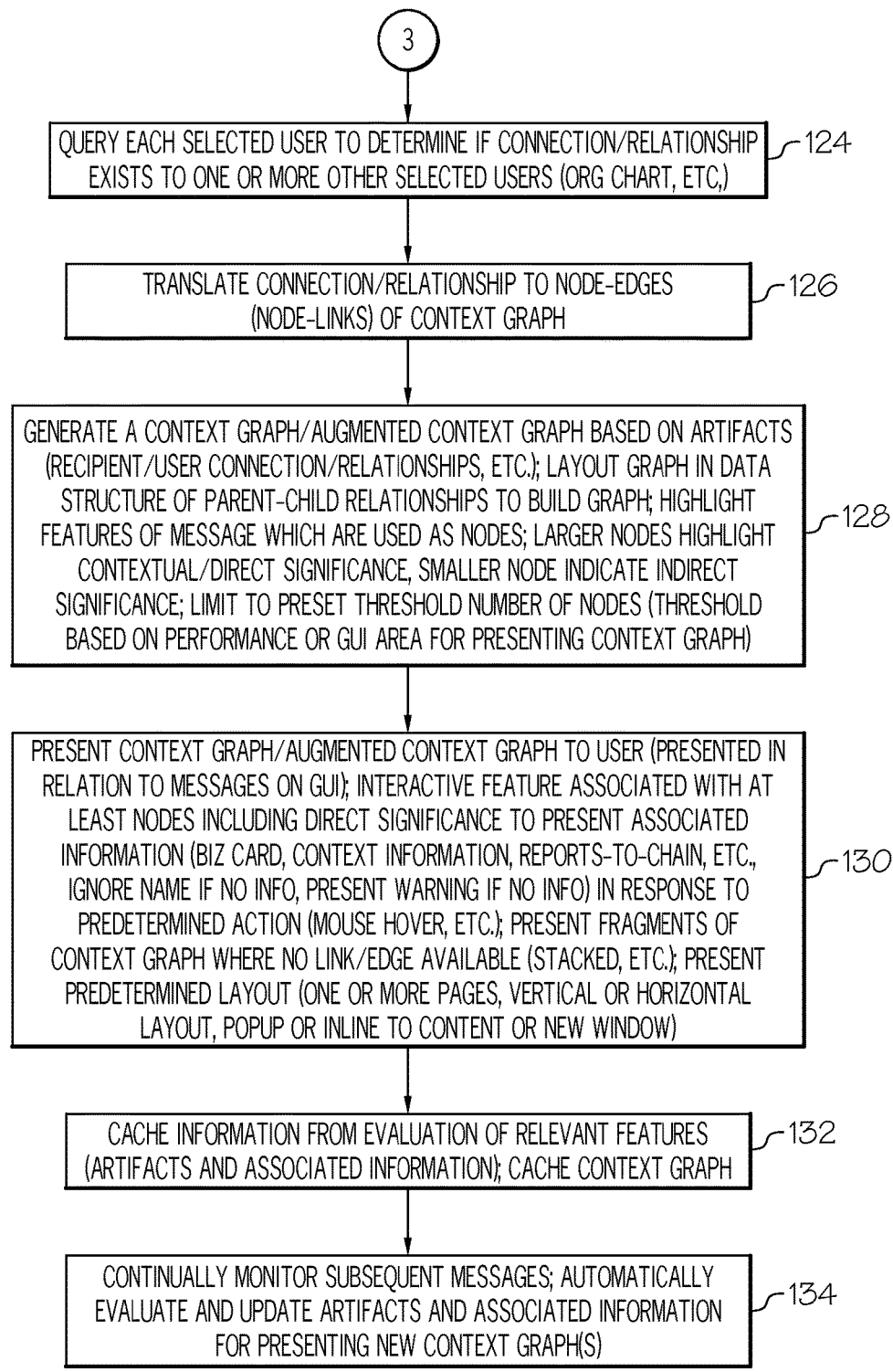

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

FIGS. 1A-1D (collectively FIG. 1) are a flow chart of an example of a method 100 for team analytics context graph generation and augmentation in accordance with an embodiment of the present invention. In block 102, an electronic message may be received by a collaboration system. The collaboration system may be a messaging system, a social network or system or other electronic communications system or network, such as e-mail, instant messaging, chat or similar communications system or network. The social network or system may be an asynchronous network or a synchronous network. An example of an asynchronous network may be Twitter where a user may follow communications generated by another user or person. Twitter is a trademark of Twitter, Inc. in the United States, other countries or both. An example of a synchronous network is IBM Connections. IBM Connections is a trademark of International Business Machines Corporation in the United States, other countries or both. The collaboration data may be associated with the message. Collaboration data may include, but is not necessarily limited to authors, editors, readers, followers, social connections, report-to-chains around each object, or other information that may be associated with collaboration between multiple users or participants. The collaboration data may be searched for and found based on relevant users. The collaboration system may include a collaboration application running on a communications device of a user, a collaboration module or program operating on a server or a combination of both. The user's communications device may be client computer system, mobile computer system or communications device, such as a smartphone or any other type communications device capable of performing the operations described herein.

In block 104, the received message may be presented on a graphical user interface (GUI) generated by the collaboration system. The collaboration system GUI may be presented on a display of the user's communications device. A feature may be presented on the collaboration system GUI for activating a team analytics context graph generation and augmentation feature. In accordance with an embodiment, activation of the team analytics context graph generation and augmentation feature may be automatically activated based on a predetermined criteria or set of factors or conditions. For example, the team analytics context graph generation and augmentation feature may be automatically generated based on a familiarity of other recipients on the message. For example, the other recipients on the message may be known by the user that received the message and the recipients may be users that the user receiving the message has collaborated with before or collaborates with on a frequent basis. A preset number of recipients on the message may also be set for operation of the analytics context generation and augmentation feature described herein.

Figure 2A:
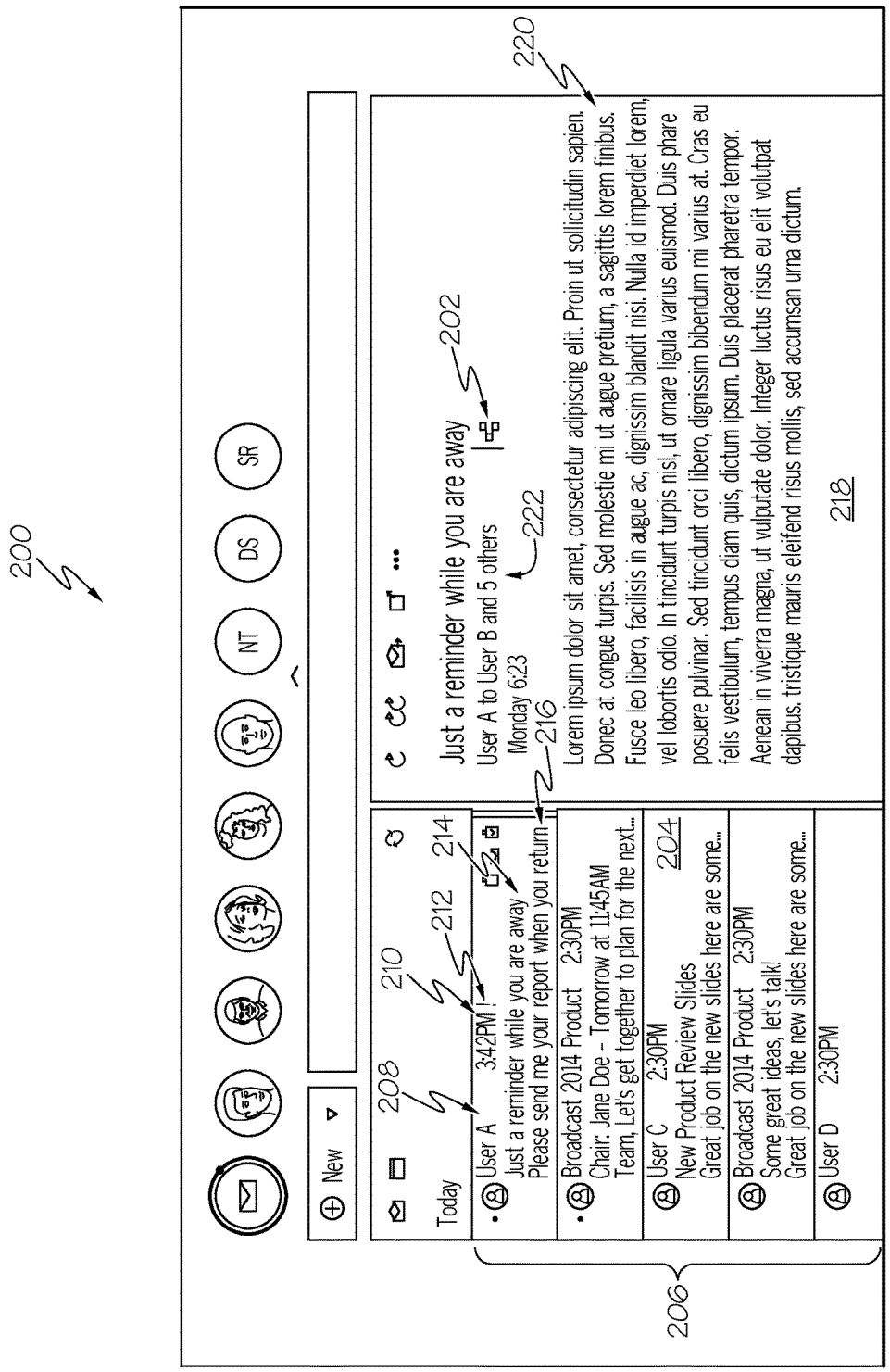
FIG. 2A is an example of a collaboration system graphical user interface including a feature for activating a team analytics context graph generation and augmentation function in accordance with an embodiment of the present invention.

Referring also to FIG. 2A, FIG. 2A is an example of collaboration system graphical user interface (GUI) 200 including a feature 202 for activating a team analytics context graph generation and augmentation function in accordance with an embodiment of the present invention. The collaboration system GUI 200 may include a first area 204 for presenting a list of messages 206 received by the collaboration system. The messages 206 may be presented in a predetermined order. For example, the messages 206 may be presented in chronological order based on the time received with the most recently received message listed first or at the top of the list of messages 206. Brief information associated with each message may be presented in the list of messages. For example, each message of the list of messages 206 may include an identification of a sender 208, a time 210 the message was received, a symbol 212 that may indicate an importance, urgency or other characteristic of the message, and a subject matter 214 of the message. The list of messages 206 may also include a limited amount of content 216 or a limited number of a first group of words of each message.

The collaboration system GUI 200 may also include a second area 218. The second area 218 may be used to present a currently open message 220 from the list of messages 206. The feature 202 for activating the team analytics context graph generation and augmentation function may be presented in the second area 218 in association with the currently open message 220. Thus, the team analytics context graph generation and augmentation function may be performed to generate a context graph corresponding to the currently open message 220 in response to activation the context graph feature 202. The feature 202 for activating the team analytics context graph generation and augmentation function may be presented adjacent an identification of the sender and/or recipients 222 of the message 220.

Returning to FIG. 1A, in block 106, relevant features may be extracted from the received message. Examples of relevant features in the received message may include, but is not necessarily limited to, users or recipients identified in the "TO", "CC" and "BCC" fields of the message, domains associated with the users or recipients, distribution lists, and attachments. A list of relevant features may be formed. Relevant features for groups may induce analysis of group membership or ownership or determination of other characteristics associated with a group.

The team analytics context graph generation and augmentation function or system may also extract reference to prior conversation elements in the received message. Examples of prior conversation elements that may be found in a received message may include, but is not necessarily limited to @mentions or reference to other users in the content of the received message, prior senders of the received message, order of recipients in the e-mail list. The conversation elements may be added to the list of relevant features and a "count" may be incremented. A "count" or number of times an element or feature is referenced in the received message and other messages in a thread or conversation may also be tracked or monitored. An element may be provided a higher weight or importance for use as a node in a context graph relative to other conversation elements based on a higher count than other elements. From/To patterns may also be extracted from prior messages.

In block 108, groups may be expanded so that each user or member of the group may be appropriately represented. Groups may be treated as individual entities when presented in a team analytics context graph.

In block 110, a context graph of prior communications or messages among participants in a conversation or users may be generated. The context graph may be generated based on the user's mail file that received the message. More frequent communications between users may indicate a strong connection and those users and their associated connection may be given a higher weight relative to other users and associated connections for use in a context graph. For example, if a user has more than ten messages sent the connection may be considered to be strong and may be assigned a higher weight relative to another user that sent fewer messages.

In block 112, a connection or relationship may be checked or determined between each participant or user in the context graph. There may be a plurality of data elements and the most frequent references to a user may be ranked. Certain users and connections between users may be used in a context graph based on the higher the rank or weight.

In block 114, a context graph corresponding to the received message may be predicted or determined to be a sparse context graph. A user may be unable to determine the context of the received message from the context graph if the context graph is sparse. A sparse context graph may have a limited number of nodes and associated edges. Edges or connections may be missing between nodes. A sparse context graph may be predicted by determining a number of nodes and associated edges of a context graph corresponding to the received message based on the extracted relevant features in block 106. An available area for the context graph in a display window or panel of the collaboration system GUI, such as GUI 200, may also be determined. The available area determined may be used to appropriately determine a number of nodes and associated edges that may be used to form the context graph.

In block 116, the determined number of nodes and associated edges may be compared to a preset threshold number of nodes and associated edges. In block 118, a determination may be made if the determined number of nodes and associated edges is less than the preset threshold. The context graph may be considered to be a spare context graph if the number of nodes and associated edges in less than the preset threshold. If the determined number of nodes and associated edges is less than the preset threshold or the context graph is predicted to be a sparse context graph, the method 100 may advance to block 136 in FIG. 1D. In block 136, an augmented context graph may be generated. The augmented context graph may include additional nodes and associated edges that permit the user to determine the context of the received message. The augmented context graph may be generated from a sparse context graph by adding a quantity of nodes and associated edges to the context graph that equal at least the preset threshold number of nodes and associated edges. An example of generating an augmented context graph will be described in more detail with reference to FIG. 1D and block 136 below.

Returning to FIG. 1B, if the predicted number of nodes and associated edges in not less than the preset threshold, the method 100 may advance to block 120. In block 120, the relevant features may be evaluated to determine artifacts that best represent the context of the received message. Examples of artifacts may include, but is not necessarily limited to, identity of users, files associated with the message, groups associated with the message, meetings referenced in the message, and any other information from the message that may be evaluated to best represent the context of the received message. Users may be recipients of the message or other persons or individuals or groups identified or referenced in the message. Users may be selected as artifacts for creating the team analytics context graph based on a set of predetermined factors or criteria. A weight may be assigned to an identification or ID of a user based on the predetermined factors or criteria. For example, an ID of a user may be assigned a higher weight to make it more likely the user may be selected as an artifact in response to the user being new to the conversation. A higher weight may be assigned to the user's ID in response to the user being a new person to the recipient of the message or the user speaks or sends a message for the first time in the conversation or thread. A weight may be assigned to a user in proportion to the user's contribution to the conversation. For example, if the user's contribution to the conversation is long, the weight assigned to the user may be in proportion to their contribution. A weight may be assigned based on the familiarity of the user to the recipient of the message. For example, a higher weight may be assigned the less familiar the recipient of the message is with the user. A higher weight may be assigned if the user is unique to the conversation. For example, the user may have a different job role or may be in a different organization from other users or recipients of the message. A higher weight may also be assigned to users that are specifically addressed or identified in a salutation or greeting of the message or that are specifically mentioned in the message. Other examples of predetermined factors or criteria may include a count associated with a particular user, a frequency of activity in a history of the conversation.

In block 122, artifacts may be retrieved from the received message that relate to a context of the received message based on the evaluation of the relevant features. Retrieving the artifacts may include selecting a group of users based on the predetermined factors or criteria similar to that previously described.

In block 124, each selected user may be queried to determine if a connection or relationship exists to one or more other selected users. For example, an organization chart, such as a "reports-to-chain" or similar organization chart or directory may be used to determine connections or relationships between users or individuals selected as artifacts or nodes to be used in the team analytics context graph.

In block 126, the connections or relationships determined in block 114 may be translated into nodes and edges or nodes and links in the context graph. Each selected user of the group of users corresponds to a node and an associated connection or relationship between two selected users corresponds to an edge or link between the nodes corresponding to the two users. The graph layout may be done using IBM Rave Engine or other similar graphing program. IBM and IBM Rave Engine are trademarks of International Business Machines Corporation in the United States, other countries or both.

In block 128, the context graph may be generated based on the artifacts or selected users and connections or relationships between the artifacts or selected users. The layout of the context graph may be in a data structure of parent-child relationships to build the graph. Features of the received message, which are used as nodes in the context graph, may be highlighted or distinguished. For example, nodes that include or represent a contextual or direct significance may be larger nodes compared to nodes that include or represent an indirect significance which are smaller nodes. For example, contextual or direct significance nodes may correspond to users that are in the TO/CC/BCC list of the received message, and any file or collaboration artifact that is explicitly referenced in the received message. Examples of indirect significance nodes may be anyone who may be on an access control list (ACL) of an artifact or anyone who is connected to a direct significance user but not in the TO/CC/BCC list.

The context graph may be limited to a preset threshold number of nodes. The preset threshold may be based on performance or predetermined size of the area of the GUI for presenting the context graph.

In block 130, the context graph may be presented to the user. The context graph may be presented in relation to the list of messages on the collaboration system GUI, such as for example as a popup or inline to the content of the collaboration system GUI. In another embodiment, the context graph may be presented in a new GUI or window. The context graph may be presented in a predetermined layout. For example, the context graph may be presented on one or more pages depending upon the number of nodes and any limit to the number of nodes that may be presented on a page. Paging may be used to present the context graph as described in more detail with reference to FIG. 2B. The context graph may be presented in a vertical or horizontal layout.

Figure 2B:
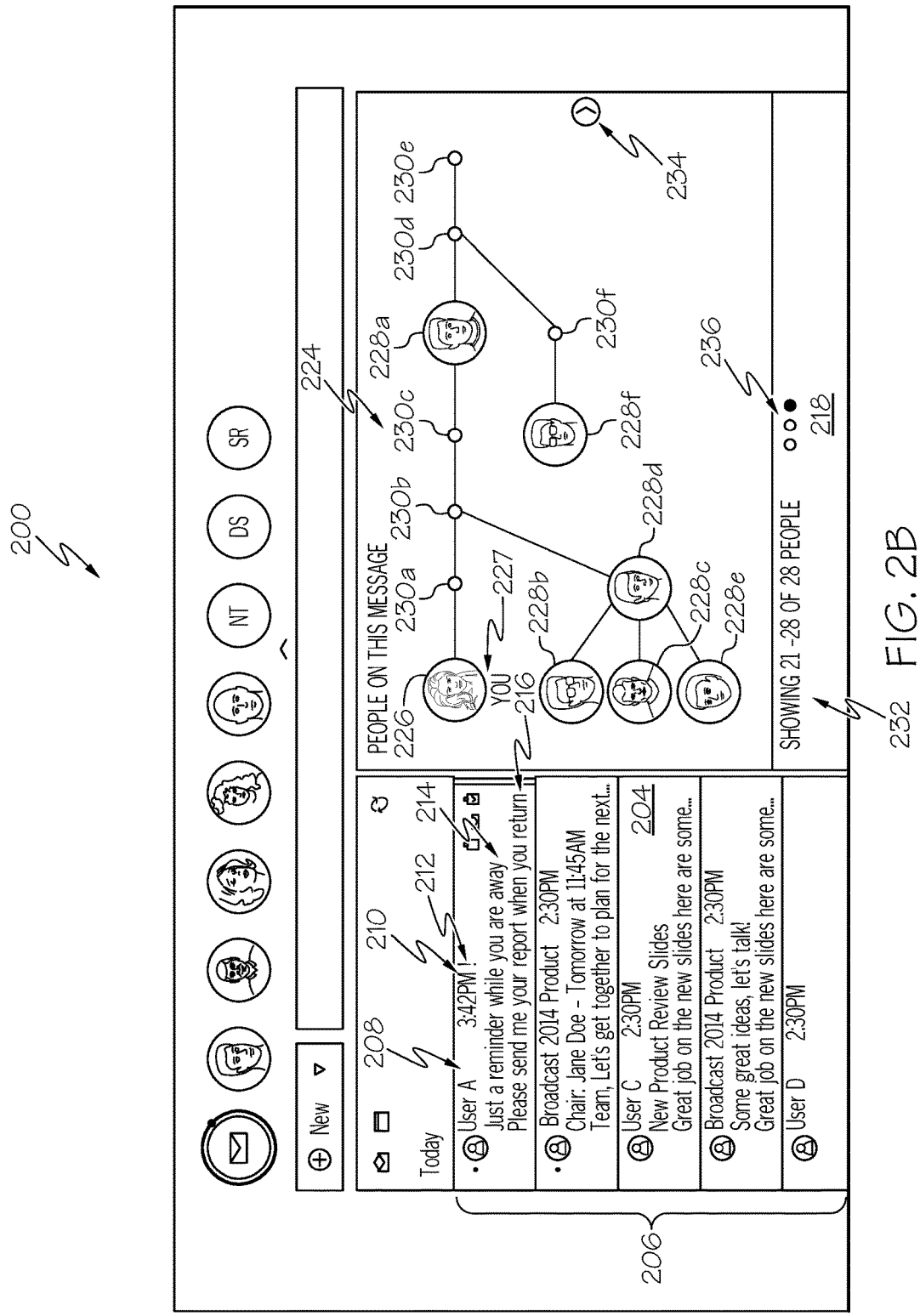
FIG. 2B is an example of the collaboration system GUI of FIG. 2A including a context graph in accordance with an embodiment of the present invention.

Referring also to FIG. 2B, FIG. 2B is an example of the collaboration system GUI 200 of FIG. 2A including a context graph 224 being presented in relation to the list of messages 206 in accordance with an embodiment of the present invention. The context graph 224 corresponding to the message 220 in FIG. 2A may be generated and presented in response to activating the feature 202 associated with the message 220 in FIG. 2A. The context graph 224 may occupy the second area 218 of the collaboration system GUI 200. The particular user that is the recipient of the message for which the context graph 224 is being presented may be represented by a node 226 that is distinguishable from other nodes of the context graph 224. For example, the node 226 corresponding to the particular user or recipient may be identified or labeled as "You" 227. The node 226 corresponding to the recipient may also be enclosed by a predetermined geometric symbol, such as a circle as shown in FIG. 2B or other geometric symbol. The predetermined geometric symbol enclosing the node 226 may also be of a particular color relative to other nodes. The node 226 may also include a photograph of the recipient within the predetermined geometric symbol.

As previously, described, nodes 228a-228f that correspond to other users that have a contextual or direct significance may be distinguished from other nodes by being larger nodes. Each of these nodes 228a-228f may also contain a photograph of the user that corresponds to each node. Nodes 230 that correspond to users or artifacts that have an indirect significance are shown smaller in the context graph 200 compared to nodes 228a-228f that have a direct significance.

The context graph 200 may also include a summary 232 of what is being viewed in the context graph 200 or particular portion or page of the context graph 200 that is current being presented in the second area 218 of the GUI 200.

A page control mechanism 234 may be provided to control movement to a next or previous page or portion of the context graph 200. Similar to that previously described, a preset threshold or number of nodes may be presented on a page or portion of the GUI 200. A paging feature 236 may also be provided that indicates that the GUI 200 is configured for gallery style or horizontal paging control. The GUI 200 may also be configured for up/down or vertical paging control.

Figure 2C:
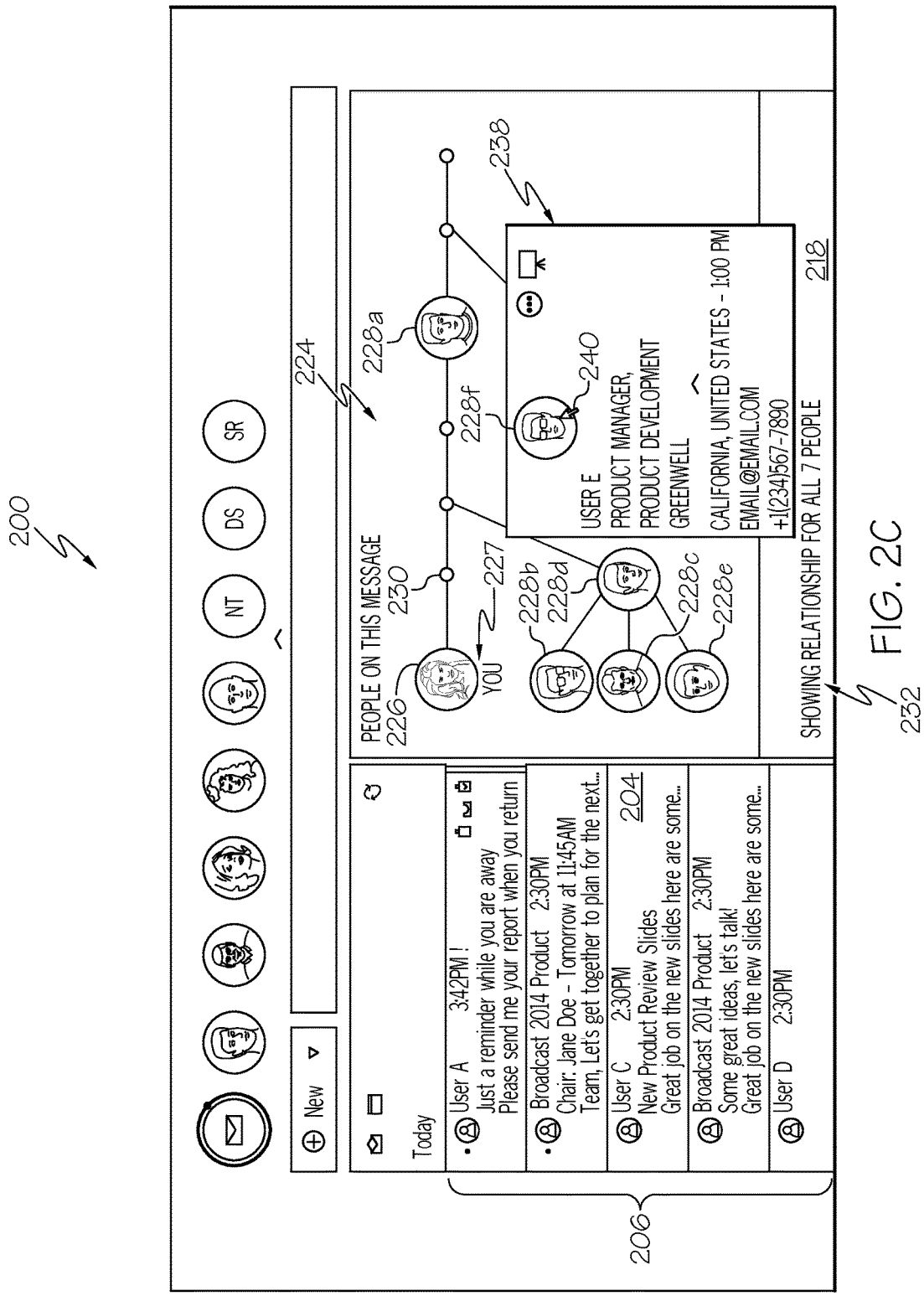
FIG. 2C is an example of the collaborative system GUI in FIG. 2B illustrating an example of an interactive feature associated with a node for presenting information associated with the node in accordance with an embodiment of the present invention.

An interactive feature may be associated with at least nodes 228a-228f that represent a contextual or direct significance to present information associated with the node in response to a predetermined action, such as a computer pointing device hovering over the node or clicking on the node. Referring also to FIG. 2C, FIG. 2C is an example of the collaborative GUI 200 in FIG. 2B illustrating an example of the interactive feature 238 associated with the node 228f for presenting information associated with the node 228f in accordance with an embodiment of the present invention. In the example illustrated in FIG. 2C, the interactive feature 238 may present personal contact information or a business card for the user corresponding to node 228f in response to a computer pointing device represented by arrow 240 in FIG. 2C hovering over or clicking-on the node 228f. Other information that may be presented by the interactive feature may include, but is not limited to, context information, reports-to information and any other information that may assist the user viewing the context graph 200 in determining the context of the received message for which the context graph 200 was generated.

Figure 2D:
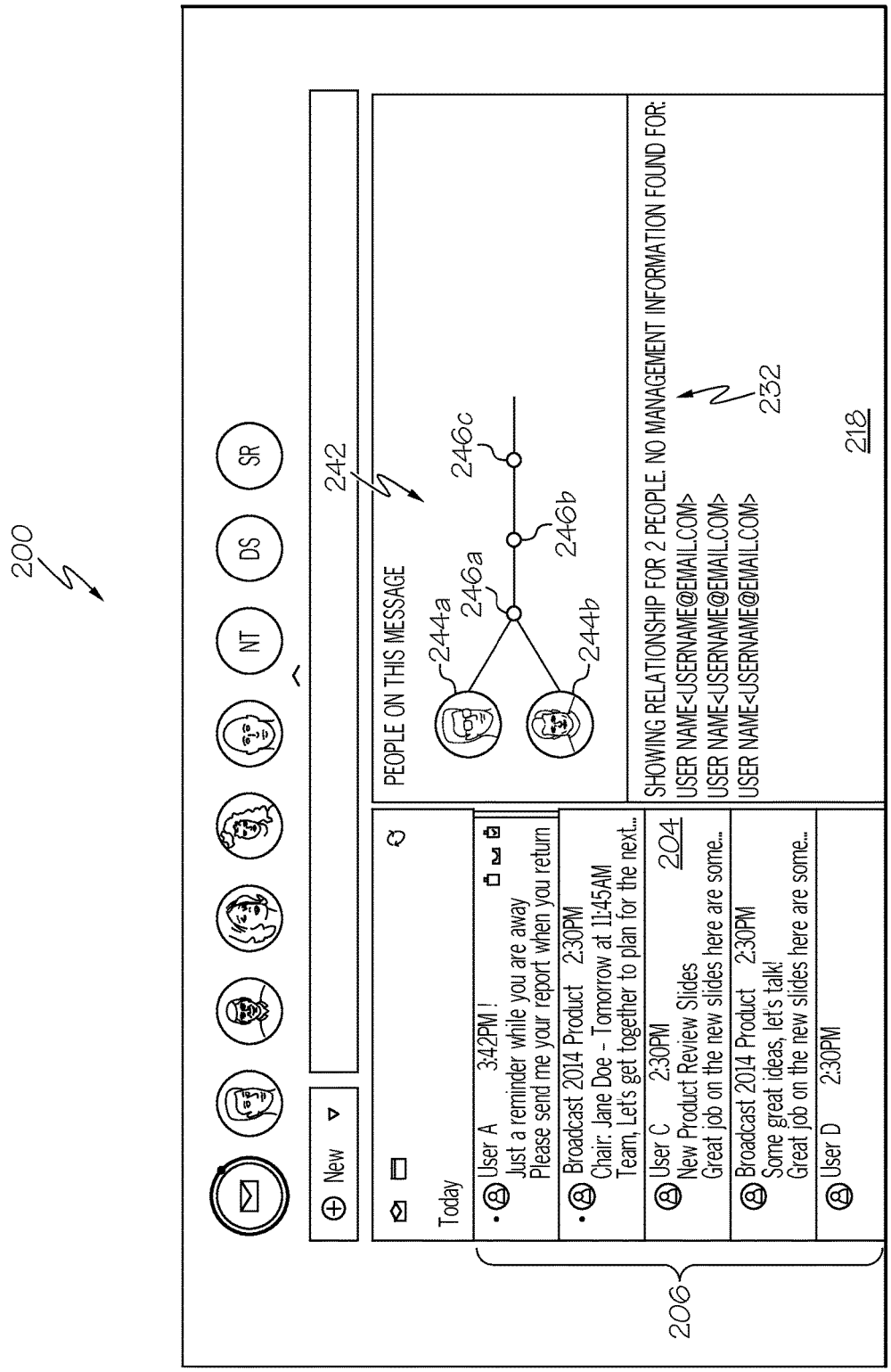
FIG. 2D is an example of the collaborative system GUI in FIG. 2B including a context graph or a portion of the context graph illustrating an example of nodes without associated information in accordance with an embodiment of the present invention.

If there is no information associated with the node, no information may be presented or a warning that no information is available may be presented in response to hovering over or clicking-on the node. A name associated with the node may be ignored in response to no management information or other information associated with node being found in response to the query in block 114. FIG. 2D is an example of the graphical user interface 200 of FIG. 2B including a context graph 242 or portion of the context graph 224 illustrating an example of nodes 244a-244b and 246a-246c without associated information in accordance with an embodiment of the present invention.

Figure 2E:
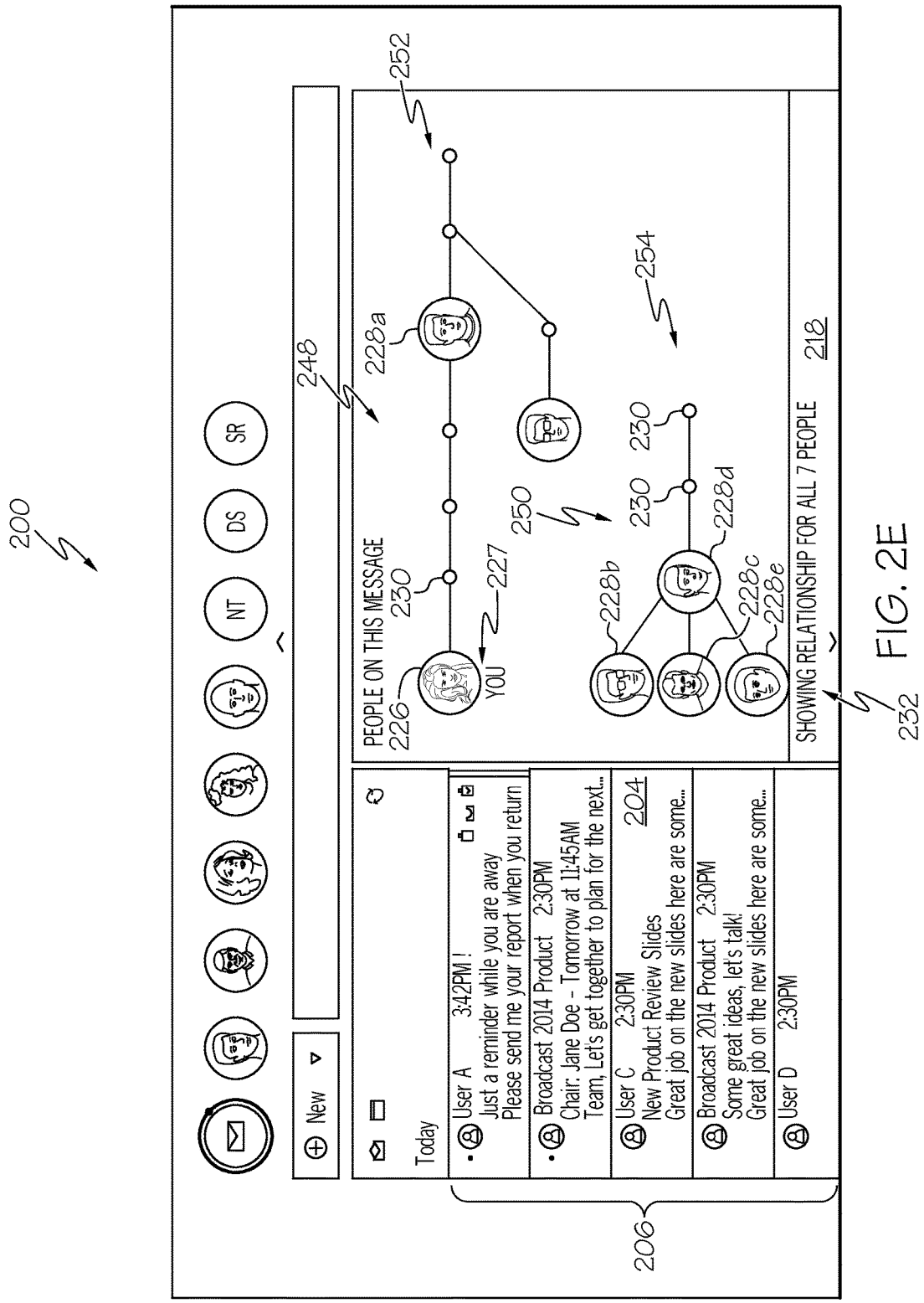
FIG. 2E is an example of the collaborative system GUI of FIG. 2B including a context graph illustrating an example of disconnected nodes or fragmented trees in the context graph in accordance with an embodiment of the present invention.

The context graph may also be shown or represented in fragments where there is no edge or link available or associated with a node or group of nodes. Referring also to FIG. 2E, FIG. 2E is an example of the collaborative system GUI 200 of FIG. 2B including a context graph 248 illustrating an example of a group of disconnected nodes 250 or fragmented trees 252 and 254 in the context graph 248 in accordance with an embodiment of the present invention.

Referring back to FIG. 1B, in block 132, information from evaluation of the relevant features in block 120 may be cached. Accordingly, the retrieved artifacts and associated information resulting from evaluation of the relevant features may be cached for use in generating other contexts graphs or updated context graphs. The context graph, such as context graph 224 in FIG. 2B may also be cached. The cached context graph 224 may be updated as new messages are received.

In block 134, subsequently received messages may be continually monitored in response to the team analytics context graph generation and augmentation feature being active. The relevant features may be automatically extracted and evaluated in response to new messages being received and updated artifacts and associated information may be retrieved similar to that described in blocks 120-126 for generating and presenting new and/or updated contexts graphs.

Figure 1D:
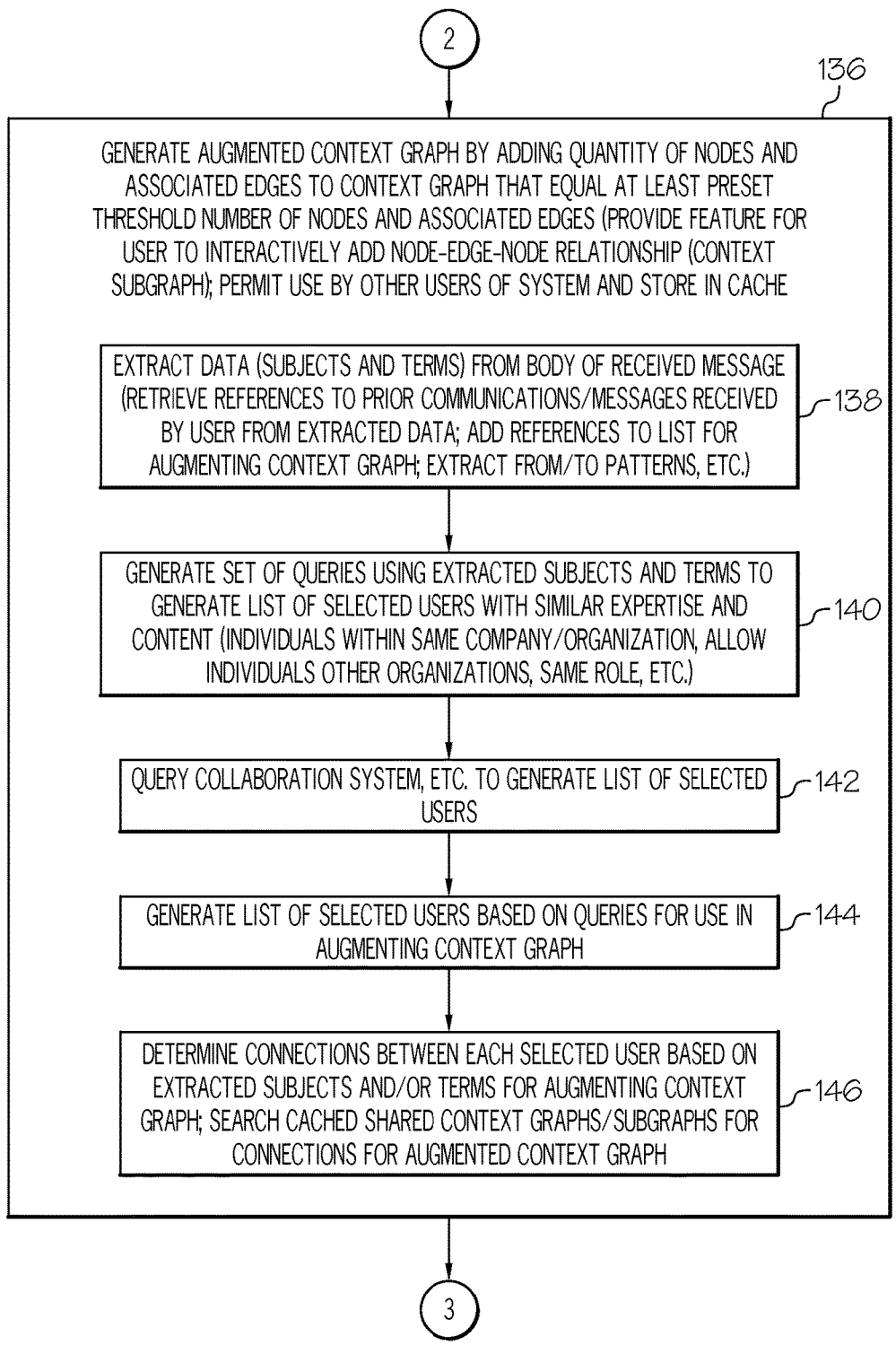

Referring to FIG. 1D and block 136, as previously discussed, an augmented context graph may be generated in response to a context graph being predicted to be a sparse context graph from which the user may be unable to determine a context of a received message that corresponds to the sparse context graph. The context graph may be predicted to be a sparse context graph in response to the predicted or determined number of nodes and associated edges in block 118 being less than the preset threshold number of nodes and associated edges based on the extracted relevant features from the received message. The augmented context graph may be generated by adding a quantity of nodes and associated edges to the context graph or sparse context graph that equal at least the preset threshold number of nodes and associated edges. As previously discussed, the predicted number of nodes and associated edges may be determined based on the extracted relevant features from the received message. A feature may be provided for the user interactively adding one or more node-edge-node relationships for augmenting the context graph. Such node-edge-node relationships may be referred to herein as sub-graphs or context sub-graphs. The sub-graphs or context sub-graphs may be stored in a cache or other storage device and the user may permit use of the sub-graphs by other users of the system for augmenting sparse context graphs they may encounter.

Blocks 138-146 represent examples of operations or functions that may be performed in generating an augmented context graph in accordance with an embodiment of the present invention and may be considered to be elements of block 136.

In block 138, data may be extracted from the body of the received message. For example, the extracted data may include subjects and terms that may be found in the received message. The subjects and terms may be extracted from the message using natural language processing or other text processing mechanism. References to prior communications or messages received by the user may be retrieved from the extracted data. Participants or users of the collaboration system referenced in the prior communications or messages of the user may be added to a list for augmenting the context graph. From/To patterns of participants and users of the system may also be extracted from the prior communications or messages of the user and may also be used to add to the list of participants or users for augmenting the context graph.

In block 140, a set of queries may be generated using the extracted subjects and terms to generate a list of selected users or participants with similar expertise and/or content that may be used to augment the context graph. For example, individuals with certain characteristics may be selected. Examples of characteristics may include but is not necessarily limited to individuals within the same company or organization, individuals with a same or similar role or background, allow guests or individuals from other organizations or other characteristics, or criteria that may make it beneficial to add the individual to the list of selected users or participants as represented as possible nodes for augmenting the context graph as described herein for determining the context of the received message.

In block 142, the collaboration system or other communications systems may be queried to generate the list of selected users. In block 144, the list of selected users may be generated based on the queries for use in augmenting the context graph.

In block 146, a connection may be determined between each selected user based on the extracted subjects and or terms for augmenting the context graph. Cached, shared context graphs or sub-graphs for connections for the augmented context graph may be searched. The method 100 may advance to block 124 and the method 100 may proceed similar to that previously described.

Figure 3A:
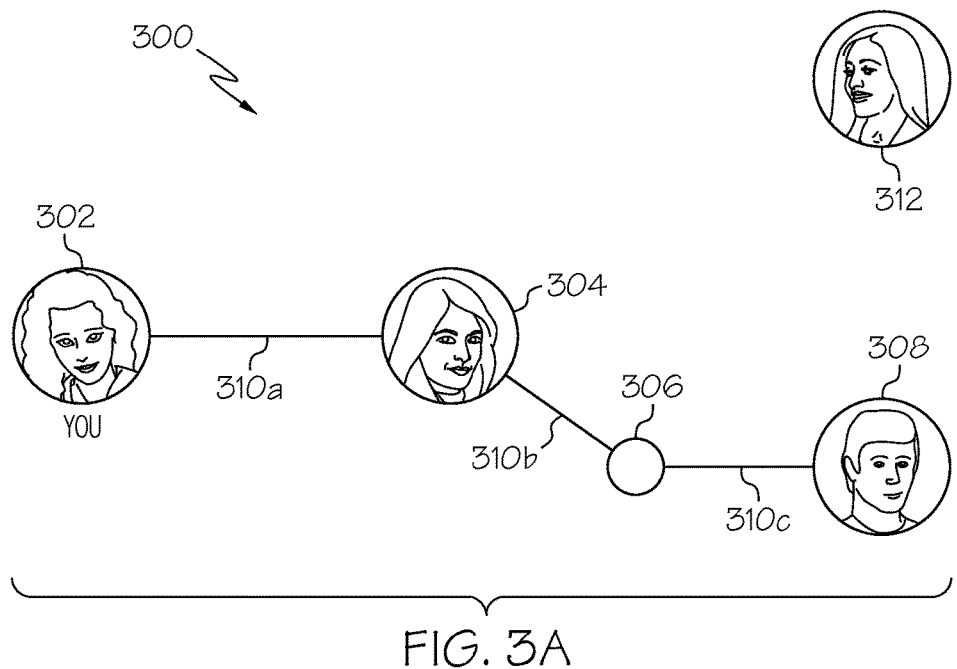
FIG. 3A is an example of a sparse context graph in accordance with an embodiment of the present invention.

FIG. 3A is an example of a sparse context graph 300 in accordance with an embodiment of the present invention. As previously described, a sparse context graph may be a context graph based on a received message from which a user may not be able to determine the context of the received message. The context graph may be considered to be a sparse context graph because the graph is determined to have a predicted number of nodes and associated edges less than a preset number or nodes and associated edges. Therefore, the message may be in need of augmentation for the user to determine a context of the received message. In the exemplary sparse context graph 300, nodes 302, 304, 306 and 308 representing users or participants are interconnected by edges 310a-310c. However, node 312 is not connected to any other node or participant on the thread or conversation. Accordingly, sparse context graph 300 may be augmented similar to that described herein to facilitate forming a connection to node 312 and thereby convey the context of the received message to the user.

Figure 3B:
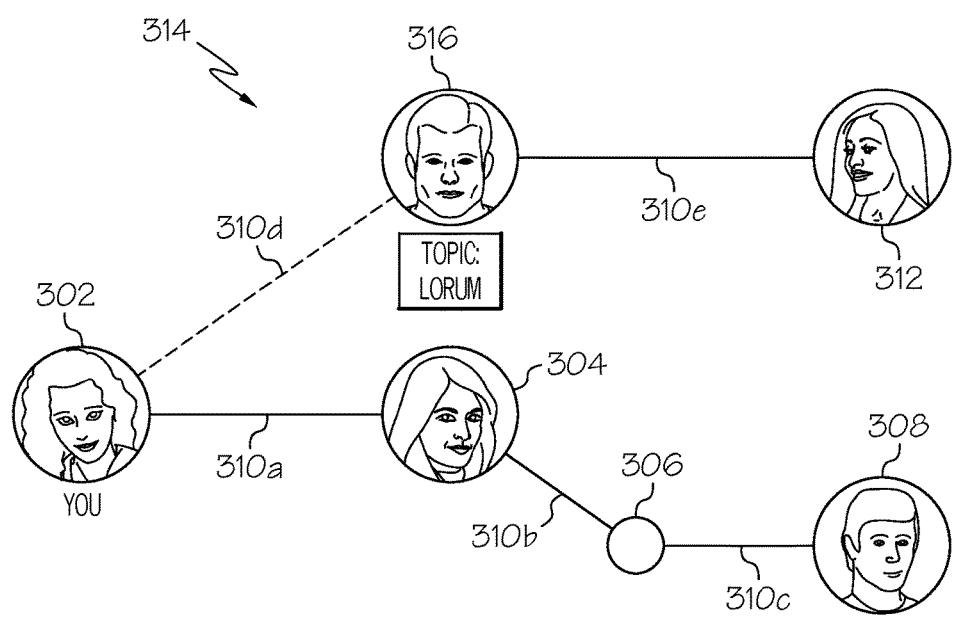
FIG. 3B is an example of augmentation of the sparse context graph of FIG. 3A in accordance with an embodiment of the present invention.

Referring also to FIG. 3B, FIG. 3B is an example of augmentation of the sparse context graph 300 of FIG. 3A to form an augmented context graph 314 in accordance with an embodiment of the present invention. In the example illustrated in FIG. 3B, the received message may include the term or topic "Lorum" which may be extracted from the body of the received message similar to that described with reference to block 138 in FIG. 1D. A query or set of queries may then be generated based on the term to query the collaboration system and/or other communications systems of the user to generate a list of selected users that may possibly be used to augment the sparse context graph 300 similar to that described with reference to blocks 140-146 in FIG. 1D. A user or participant corresponding to node 316 may be selected from a group of users or participants for augmenting the sparse context graph 300 similar to that described with reference to the method 100. Connections or relationships between the user corresponding to node 316 and the users represented by nodes 302 and 312 may be determined similar to that described with reference to block 146 in FIG. 1D and/or blocks 124-130 in FIG. 1C to provide edges 310d and 310e in augmented graph 314. The edge 310d may be shown as a broken or dashed line in the augmented context graph 314 to distinguish the edge 310d as being added to augment the content graph 314. For example, the edge 310d may represent an indirect connection between the user represented by node 302 and the user represented by node 316, whereas there may be a direct connection between user/node 316 and user/node 312 as represented by edge 310e being a solid line. In the example in FIG. 3B, the term "Lorum" may also be presented in association with the node 316 in the augmented context graph 314 to present to the user/node 302 the basis for the added or augmented node 316.

Figure 4:
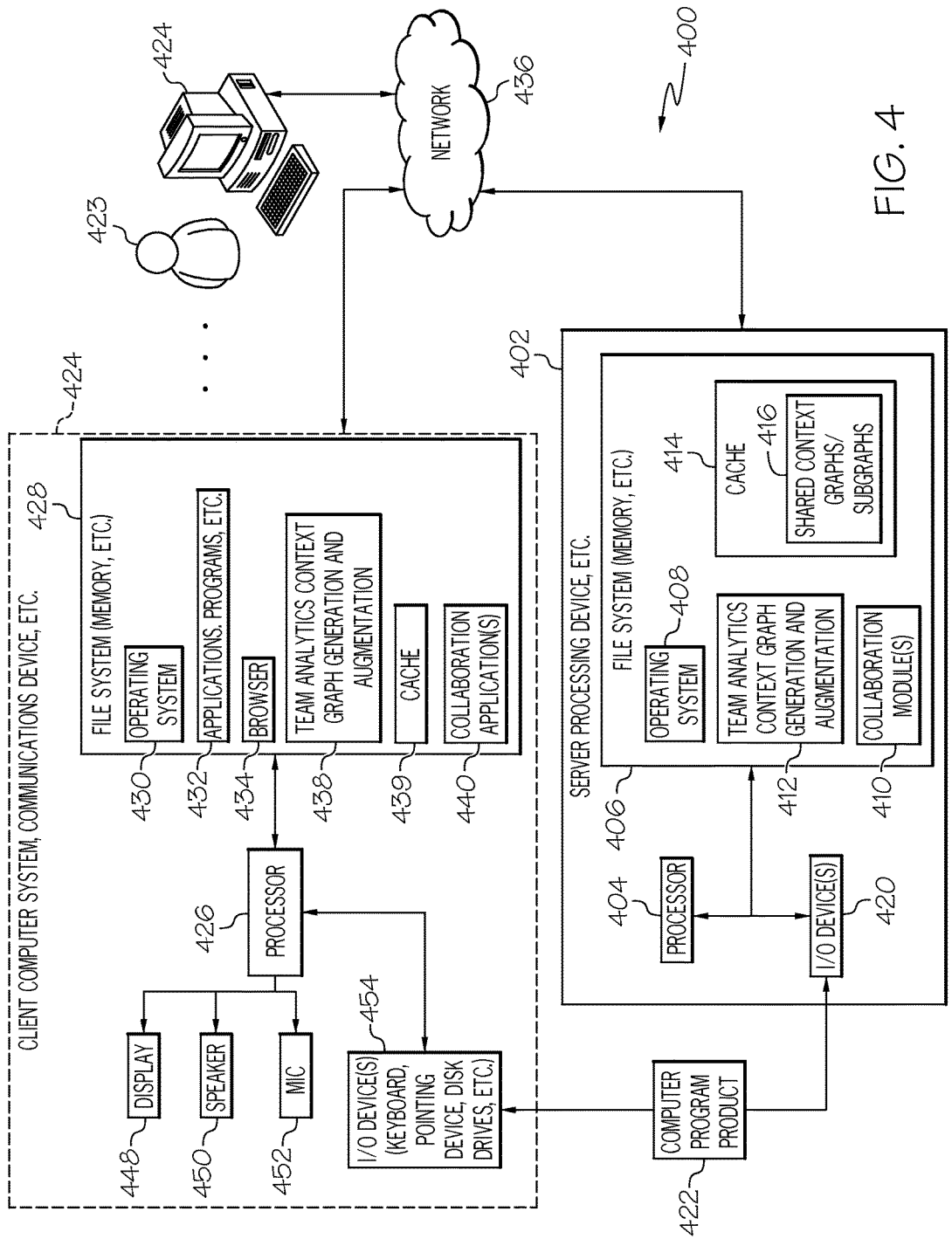
FIG. 4 is a block schematic diagram of an example of a system for team analytics context graph generation and augmentation in accordance with an embodiment of the present invention.

FIG. 4 is a block schematic diagram of an example of a system 400 for team analytics context graph generation and augmentation in accordance with an embodiment of the present invention. The method 100 of FIGS. 1A-1D may be embodied in and performed by the system 300 and the exemplary GUIs 200 in FIGS. 2A-2E may be generated and presented by the system 400 and a sparse context graph may be augmented similar to that described with reference to FIGS. 3A and 3B. The system 400 may include a processing device 402. The processing device 402 may be a server or similar processing device. The processing device 402 may include a processor 404 for controlling operation of the processing device 402 and for performing functions, such as those described herein with respect to method 100 in FIGS. 1A-1D. The processing device 402 may also include a file system 406 or memory. An operating system 408, applications and other programs may be stored on the file system 406 for running or operating on the processor 404. One or more collaboration modules 410 or systems may also be stored on the file system 406 and may be compiled and run on the processor 404 to perform the functions or operations described herein. The collaboration module 410 may be any type of online communications mechanism, networking arrangement or system for online or Internet communications or conversations, such as e-mail, instant messaging, chat or similar communications system or network.

A team analytics context graph generation and augmentation module 412 may also be stored on the file system 406. The method 100 of FIGS. 1A-1D may be embodied in the team analytics context graph generation and augmentation module 412 and performed by the processor 404 when the team analytics context graph generation and augmentation module 412 is compiled and run on the processor 404. The team analytics context graph generation and augmentation module 412 may operate in conjunction with the collaboration module 410. The team analytics context graph generation and augmentation module 412 may be a separate component from the collaboration module 410 or in another embodiment, the team analytics context graph generation and augmentation module 412 may be a component of the collaboration module 410.

The file system 406 may also include a cache 414 for caching information resulting from evaluation of the relevant features including artifacts, connections or relationships between artifacts, and context graphs and context sub-graphs 416 similar to that previously described which may be shared with other users for use in determining connections or relationships between users for generating other context graphs.

The processing device 402 may also include one or more input devices, output devices or combination input/output devices, collectively I/O devices 420. The I/O devices 420 may include, but are not necessarily limited to, a keyboard or keypad, pointing device, such as a mouse, disk drive and any other devices to permit a user to interface with and control operation of the processing device 402 and to access the collaboration module 410 or system and team analytics context graph generation and augmentation module 412. At least one of the I/O devices 420 may be a device to read a computer program product, such as computer program product 422. The computer program product 422 may be similar to that described in more detail herein. The collaboration module 410 and team analytics context graph generation module 412 may be loaded on the file system 406 from a computer program product, such as computer program product 422.

A member of a network, such as a social network, or user 423 of the system 400 may use a computer system 424 or communications device to access the processing device 402 or server and collaboration module 410 and team analytics context graph generation and augmentation module 412. The computer system 424 or communications device may be any sort of communications device including a mobile or handheld computer or communications device. The computer system 424 may include a processor 426 to control operation of the computer system 324 and a file system 428, memory or similar data storage device. An operating system 430, applications 432 and other programs may be stored on the file system 428 for running or operating on the processor 426. A web or Internet browser 434 may also be stored on the file system 428 for accessing the processing device 402 or server via a network 436. The network 436 may be the Internet, an intranet or other private or proprietary network.

A team analytics context graph generation and augmentation application 438 may also be stored on the file system 428. The method 100 in FIGS. 1A-1D or at least portions of the method 100 may be embodied in and performed by the team analytics context graph generation and augmentation application 438. The team analytics context graph generation and augmentation application 438 may be compiled and run on the processor 426 to perform functions similar to those described with respect to method 100.

The file system 428 may also include a cache 439 for caching information resulting from evaluation of the relevant features including artifacts, connections or relationships between artifacts, and context graphs similar to that previously described.

One or more collaboration applications 440 may also be stored on the file system 428. The one or more collaboration applications 440 may be any type of online communications mechanism for online communications or conversations. The team analytics context graph generation and augmentation application 438 may be a separate component from the collaboration application 440 as shown in the exemplary embodiment in FIG. 4 or in another embodiment, the team analytics context graph generation and augmentation application 438 may be a component of the collaboration application 440.

The collaboration application 440 and the team analytics context graph generation and augmentation application 438 operating on the computer system 424 may interface with or operate in conjunction with the collaboration module 410 and team analytics context graph generation and augmentation module 412 on the processing device 402 or server to perform the functions and operations described herein. Accordingly, collaboration application 440 and team analytics context graph generation and augmentation application 438 operating on the computer system 424 may perform some of the functions and operations of the method 100 and collaboration module 410 and team analytics context graph generation and augmentation module 412 operating on the processing device 402 or server may perform other functions of the method 100. Some embodiments of the present invention may include only the collaboration module 410 and team analytics context graph generation and augmentation module 412 on the processing device 402 or server, and other embodiments may include only the collaboration application 440 and team analytics context graph generation and augmentation application 438 operating on the client computer system 424 or communications device.

The client computer system 424 or communications device may also include a display 448, a speaker system 450, and a microphone 452 for voice communications. Commands may be presented on the display 448 for controlling operation of the collaboration module 410 and team analytics context graph generation and augmentation module 412 and/or team analytics context graph generation and augmentation application 438 and collaboration application 440 and for performing the operations and functions described herein. The exemplary GUIs 200 in FIGS. 2A-2E and 300 in FIGS. 3A-3B may be presented on the display 448.

The computer system 424 may also include one or more input devices, output devices or combination input/output devices, collectively I/O devices 454. The I/O devices 454 may include a keyboard or keypad, pointing device, such as a mouse, disk drives and any other devices to permit a user, such as user 423, to interface with and control operation of the computer system 424 and to access the collaboration application 440 and collaboration module or system 410 on server 402. The I/O devices 454 may also include at least one device configured to read computer code from a computer program product, such as computer program product 422.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of embodiments of the invention. As used herein, the singular forms "a", "an", and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to embodiments of the invention in the form disclosed. Many modifications and variations will be apparent to those of ordinary skill in the art without departing from the scope and spirit of embodiments of the invention. The embodiment was chosen and described in order to best explain the principles of embodiments of the invention and the practical application, and to enable others of ordinary skill in the art to understand embodiments of the invention for various embodiments with various modifications as are suited to the particular use contemplated.

Although specific embodiments have been illustrated and described herein, those of ordinary skill in the art appreciate that any arrangement which is calculated to achieve the same purpose may be substituted for the specific embodiments shown and that embodiments of the invention have other applications in other environments. This application is intended to cover any adaptations or variations of the present invention. The following claims are in no way intended to limit the scope of embodiments of the invention to the specific embodiments described herein.

What is claimed is:

1. A method for team analytics context graph generation and augmentation, comprising:
    extracting, by a processor, a set of relevant features from a received message;
    predicting, by the processor, a context graph corresponding to the received message being sparse based on the extracted relevant features, a context of the received message being indeterminable from the context graph in response to the context graph being sparse, wherein the context graph is a sparse context graph in response to a number of nodes and associated edges of the context graph corresponding to the received message being below a preset threshold number of nodes and associated edges;
    generating, by the processor, an augmented context graph in response to the context graph being predicted to be sparse, wherein the augmented context graph is generated by adding a quantity of nodes and associated edges to the sparse context graph such that the context of the received message is determinable from the augmented context graph, wherein generating the augmented context graph comprises:
        extracting data from the received message, the data comprising subjects and terms in the received message;
        automatically generating a set of queries using the subjects and terms extracted from the received message to generate a list of selected users with a similar expertise or content corresponding to the subjects and terms;
        generating the list of selected users based on the set of queries;
        determining connections between each selected user of the list of selected users, wherein determining connections comprises searching a cache comprising previously generated context graphs and sub-graphs;
        translating the selected users and connections between the selected users into nodes and edges of the augmented context graph;
        building the augmented context graph in a data structure of parent-child relationships from translating the selected users and connections into the nodes and edges of the augmented context graph, the context of the received message being determinable from the augmented context graph; and
    presenting, by the processor, the augmented context graph.

2. The method of claim 1, wherein predicting the context graph corresponding to the message being sparse comprises:
    determining the number of nodes and associated edges of the context graph corresponding to the received message based on the extracted relevant features; and
    comparing the number of nodes and associated edges of the context to the preset threshold number of nodes and associated edges, wherein the context graph is the sparse context graph in response to the predicted number of nodes and associated edges of the context graph being less than the preset threshold number of nodes and associated edges.

3. The method of claim 1, wherein generating the augmented context graph comprises:
    retrieving references to prior communications from the extracted data; and
    adding the references to a list for augmenting the context graph.

4. The method of claim 3, wherein generating the augmented context graph further comprises extracting From/To patterns from the prior communications for generating the augmented context graph.

5. The method of claim 1, further comprising querying each user of the list of selected users to determine a connection or relationship to one or more other users of the list of selected users.

6. The method of claim 1, wherein nodes in the augmented context graph that include a direct contextual significance are distinguished from nodes that include an indirect contextual significance.

7. The method of claim 6, wherein at least nodes that include a direct contextual significance comprises an interactive feature, wherein information associated with the node is presented in response to activation of the interactive feature.

8. The method of claim 6, further comprising presenting the augmented context graph in a plurality of fragments in response to no edge being available between a first set of nodes and a second set of nodes.

9. The method of claim 1, further comprising caching the relevant features and associated information from an evaluation of the relevant features and caching the augmented context graph.

10. The method of claim 9, further comprising:
    continuously monitoring new messages being received;
    automatically evaluating the relevant features of each new message; and
    updating the relevant features and associated information based on the evaluation for presenting a new context graph or augmented contextual graph.

11. A system for team analytics context graph generation and augmentation, comprising:
    a processor;
    a module operating on the processor for team analytics context graph generation and augmentation, the module being configured to perform a set of functions comprising:
    extracting a set of relevant features from a received message;
    predicting a context graph corresponding to the received message being sparse based on the extracted relevant features, a context of the received message being indeterminable from the context graph in response to the context graph being sparse, wherein the context graph is a sparse context graph in response to a number of nodes and associated edges of the context graph corresponding to the received message being below a preset threshold number of nodes and associated edges;

generating an augmented context graph in response to the context graph being predicted to be sparse, wherein the augmented context graph is generated by adding a quantity of nodes and associated edges to the sparse context graph such that the context of the received message is determinable from the augmented context graph, wherein generating the augmented context graph comprises:

extracting data from the received message, the data comprising subjects and terms in the received message;

automatically generating a set of queries using the subjects and terms extracted from the received message to generate a list of selected users with a similar expertise or content corresponding to the subjects and terms;

generating the list of selected users based on the set of queries;

determining connections between each selected user of the list of selected users, wherein determining connections comprises searching a cache comprising previously generated context graphs and sub-graphs;

translating the selected users and connections between the selected users into nodes and edges of the augmented context graph;

building the augmented context graph in a data structure of parent-child relationships from translating the selected users and connections into the nodes and edges of the augmented context graph, the context of the received message being determinable from the augmented context graph; and presenting the augmented context graph.

12. The system of claim 11, wherein the set of functions further comprises:
querying each user of the list of selected users to determine a connection or relationship to each other user of the list of selected users.

13. The system of claim 11, wherein the set of functions further comprises:
caching the augmented context graph;
continuously monitoring new messages being received;
automatically evaluating the relevant features of each new message; and
updating the relevant features and associated information based on the evaluation for presenting a new context graph or augmented contextual graph.

14. A computer program product for team analytics context graph generation and augmentation, the computer program product comprising a computer readable storage medium having program instructions embodied therewith, wherein the computer readable storage medium is not a transitory medium per se, the program instructions being executable by a device to cause the device to perform a method comprising:

extracting a set of relevant features from a received message;

predicting a context graph corresponding to the received message being sparse based on the extracted relevant features, a context of the received message being indeterminable from the context graph in response to the context graph being sparse, wherein the context graph is a sparse context graph in response to a number of nodes and associated edges of the context graph corresponding to the received message being below a preset threshold number of nodes and associated edges;

generating an augmented context graph in response to the context graph being predicted to be sparse, wherein the augmented context graph is generated by adding a quantity of nodes and associated edges to the sparse context graph such that the context of the received message is determinable from the augmented context graph, wherein generating the augmented context graph comprises:

extracting data from the received message, the data comprising subjects and terms in the received message;

automatically generating a set of queries using the subjects and terms extracted from the received message to generate a list of selected users with a similar expertise or content corresponding to the subjects and terms;

generating the list of selected users based on the set of queries;

determining connections between each selected user of the list of selected users, wherein determining connections comprises searching a cache comprising previously generated context graphs and sub-graphs;

translating the selected users and connections between the selected users into nodes and edges of the augmented context graph;

building the augmented context graph in a data structure of parent-child relationships from translating the selected users and connections into the nodes and edges of the augmented context graph, the context of the received message being determinable from the augmented context graph; and presenting the augmented context graph.

15. The computer program product of claim 14, wherein the method further comprises:
caching the augmented context graph;
continuously monitoring new messages being received;
automatically evaluating the relevant features of each new message; and
updating the relevant features and associated information based on the evaluation for presenting a new context graph or augmented contextual graph.

* * * * *